Oct. 28, 1947.   I. B. HOLTZ   2,429,720
TIRE CHAIN SECURING DEVICE
Filed Feb. 1, 1944
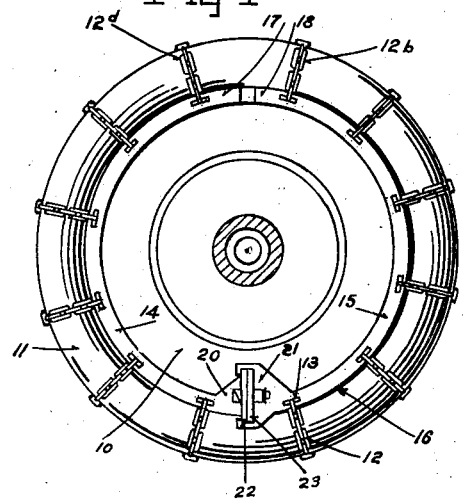
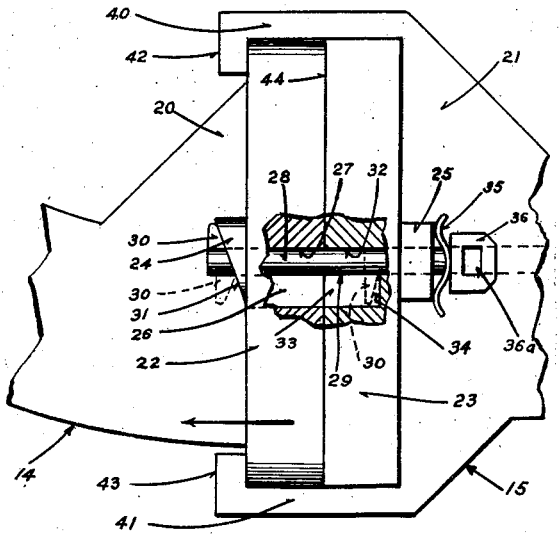
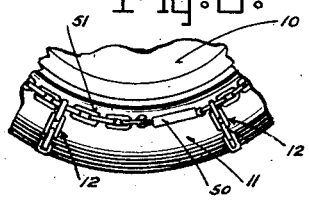
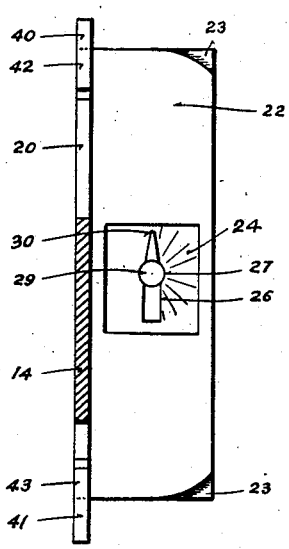
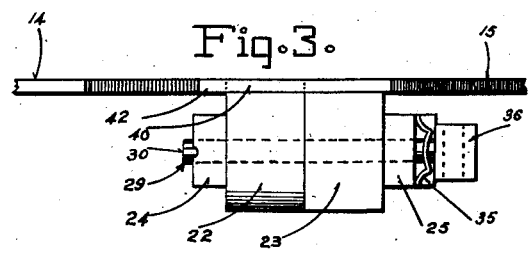
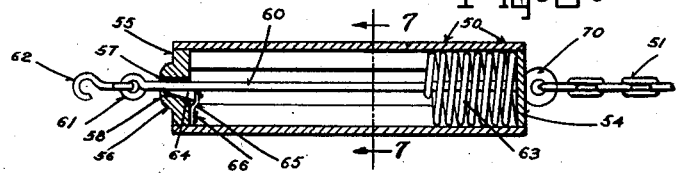
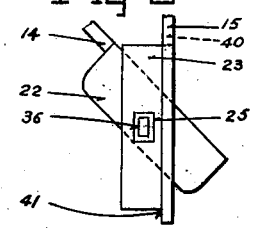
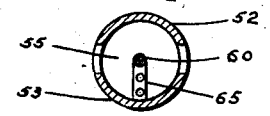
Inventor
I. Basil Holtz
Attorneys Patented Oct. 28, 1947

2,429,720

UNITED STATES PATENT OFFICE 2,429,720

TIRE CHAIN SECURING DEVICE

Ireneus Basil Holtz, Ashville, Pa.

Application February 1, 1944, Serial No. 520,656

3 Claims. (Cl. 152—241)

This invention relates to tire chains and is more particularly directed to an improvement in a split ring described and claimed in my Patent #2,328,808, granted September 7, 1943.

An object of the invention is the provision of a ring forming one support for cross chains of a tire chain for automobile wheels in which the ring is formed of two sections connected together so that these sections may be manipulated relatively for the easy application of a tire chain to a wheel.

Another object of the invention is the provision of a ring formed of a pair of hingedly connected sections to which the cross chains are attached at the inner side of the wheel with means for maintaining the sections properly hinged, while permitting the sections to be broken or readily disengaged for a quick removal of the chains from the wheel.

Another object of the invention is the provision of a ring forming a support for the cross chains at one side of the wheel with the ring being formed of sections which may be readily disengaged or connected to each other during the removal or application of the chains to a tire, a key pin forming the locking engagement for the sections with the sections being held in operative relation by said key pin, the latter being adapted to be rotated to place the key pin in such position that the sections may be readily removed from each other.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Fig. 1 is a view in elevation of an automobile wheel showing the tire chain ring member applied to the inner face thereof.

Fig. 2 is a greatly enlarged side view of the jointed connection between the sections of a split ring, forming a support at one side of the wheel.

Fig. 3 is a top plan view of the hinged connection shown in Fig. 2.

Fig. 4 is a vertical end view of the connection shown in Fig. 2 looking from left to right.

Fig. 5 is a reduced end view, showing the sections moved relative to each other to disconnect them.

Fig. 6 is a vertical longitudinal section of a chain tension means.

Fig. 7 is a transverse section along the line 7—7 of Fig. 6.

Fig. 8 is a fragmentary side view of the outer face of the wheel showing the tension means in position on the chain at this side of the wheel.

Referring more particularly to the drawings, 10 designates an automobile wheel having a tire 11 to which, as illustrated, is applied a tire chain constructed according to the principles of the present invention. This chain consists of the usual number of cross links 12, which extend around the outer rim of the tire, with one end of each chain, as shown in Fig. 1, being connected to passages 13 formed in sections 14 and 15 of a split ring generally designated by the numeral 16. The other ends of the chain are connected in the usual manner to a circular chain which is located at the outer face of the vehicle wheel.

The ring 16 consists of flat sections 14 and 15 and these connections are semi-circular, having a pair of their free ends adjacently disposed at 17 and 18 which are connected with the outer circular chain 51 by the cross chains 12a and 12b. The other two ends of the ring section which are to be locked together are enlarged widthwise, i. e., in the plane of the ring, as shown at 20 and 21. These broader portions are located diametrically opposite the ends 17 and 18 respectively.

As shown more particularly in Figs. 2 to 4, a bar 22 is welded or secured in any approved manner to the end of the enlargement 20 of the section 14, while a bar 23 is secured to the face of the enlargement 21 of the section 15. These bars have their inner faces in contact when the tire chain is located in operative relation on the tire 11. It will be noted that the bars 22 and 23 are considerably thicker than the sections 14 and 15 in order to give them sufficient strength to provide a jointed connection between the two sections. The outer face of the bar 22 as shown at 24 has a cam member for a purpose which will be presently explained. The outer face of the bar 23 has a boss 25.

The members 22 and 23 have alined key hole slots, comprising respectively circular passages 27 and 32 which receive the shank 28 of a pin 29. The left hand end of the pin carries a lateral extension 30 which when the pin 29 is turned a partial rotation rides upon the inclined surface 31 of the cam member 24, and because of the engagement of the head 36, at the opposite end of the pin, engaging the member 23 causes the latter to be locked against the member 22. The pin with the projection at its inner end is key shaped and to accommodate its longitudinal movement the passages through the members are in the form of key holes so that it may be retracted when the lug 30 is disengaged from the cam surface. In order to prevent the complete retraction of the pin 29 a portion of the end of the slot in member 23 is closed, as indicated at 34.

The pin 29 extends through the boss 25 and through a passage in a spring washer 35 which rests upon the outer end of the boss 25. A manipulating head 36 is secured to the outer end of the pin 29 so that the spring 35 is located between the member 36 and the boss 25. As shown in Fig. 2, when the projection 30 is in the position illustrated said spring will be under compression for maintaining the pin in such position for retaining the bars 22 and 23 in flat contact with each other, and the sections 14 and 15 in the positions shown in Fig. 1.

The edge of the left hand face (Fig. 2) of the member 22 extends across the enlarged end 20 of the semi-circular ring 14 and the corners of its top and bottom edges which are spaced from the ring may be curved. These edges cooperate with the overlying hook-like extensions 40 and 41 on the enlargement 21 of the semi-circular ring 15, said extensions having right angular extremities 42 and 43, respectively, which engage with the left hand face of member 22 when the two portions 14 and 15 of the ring are in operative position, the interlocking of said parts being accomplished by placing the faces of members 22 and 23 against each other and either twisting one with relation to the other about the pin 29, or by a bodily crosswise movement of these ends of the ring sections for a distance sufficient to pass the member 22 beneath the hooks 42, 43.

As has been stated, the spring 35, located between the boss 25 and the manipulating head 36, exerts pressure or a pull on the key 29, so that the member 30 will be maintained on the cam face 31. The cam may have a groove to receive the inner edge of the member 30 when the key pin is in the position shown in Fig. 2, for aiding in maintaining the pin in operative position.

When it is desired to remove the chain, the key or pin 29 may be rotated through 180° from the position shown in Fig. 2, so that the member 30 will aline with the key opening of slot 26, and the two sections 14 and 15 may be rocked on the bar 29 as shown at Fig. 6, whereupon it may be retracted until its projection 30 engages the shoulder 34 which, acting as a stop, permits the pin from becoming lost by disconnection from ring section 15. The ring sections being thus unlocked, they may be readily disengaged by a slight relative lateral movement sufficient to disengage the member 22 from the hooks or projections 42 and 43. The ring sections 14 and 15 being then only loosely connected at their opposite extremities by reason of the cross chains 12 and their connection in turn with the circular chain 51, enables the operator to separate the members 22 and 23, sufficiently to withdraw the anti-skid attachment from the wheel tire.

In the application of the device to a tire, the positioning of the cross chains 12 will generally position the members 22 and 23 so that the latter may be hooked together by a slight crosswise movement of one on the other sufficient to engage the member 22 within the hooks 42, 43.

The ring 16, as shown in Fig. 1, is in a position on a tire located on the right hand wheel of the vehicle, with the ring being located at the inner face of the wheel. Fig. 1 also discloses the proper position of the ring 16 for removing the same and breaking the link by the rotation of the pin 29 from its position illustrated in Fig. 2, to the dotted line position.

It will be noted from this simplified construction that the split ring 16 may be readily broken for releasing the sections 14 and 15 from each other, for the removal or the application of the tire chain to the vehicle with little or no trouble.

Referring more particularly to Figs. 6 to 8, inclusive, it will be seen that a form of tension means generally designated by the numeral 50 for the tire chains is disclosed. The tension means is connected between the ends of a chain 51 which encircles the outer face of the wheel 10 while the ring 16 is applied to the inner face of the wheel. The member 50 maintains the chain in position when the cross chains 12 which are connected to the sections 14 and 15 of the split ring 16 at one side of the wheel and the chain 51 at the other side of said wheel are arranged over the tread of the tire 11.

The member 50 is in the form of an open casing and includes a pair of curved walls 52 and 53 connected together at the ends thereof by disks 54 and 55. The disk 55 has a boss 56 surrounding a central opening 57. A passage 58 is located in the disk 55 and is in communication with the opening 57.

A rod or cable 60 projects through the passage 57 and is disposed along the longitudinal axis of the member 50. The outer end 61 is formed into an eye which is attached to one end of the chain 51 by a hook 62. The inner end of the rod 60 is secured in any approved manner to the inner end of a coil spring 63 located in the member 50. The outer end of said spring is secured to the disk 54.

A wedge shaped member 64 is secured to a flat spring 65 which in turn is secured at 66 to the disk 55. The wedge shaped member is in frictional contact with the rod or cable 60, and is movable into the passage 58 to limit or prevent outward movement of the rod 60 from the member 50. The spring will tend at all times to return the rod within the member 50 and release the wedge shaped member 64.

An eye 70 is secured to the other end of the chain 51 so that said chain will be maintained under sufficient tension to retain the tire chain on the tire.

The head 36 has a transverse passage 36a which is adapted to receive a suitable tool for turning the head and shank when desired for placing the projection 30 in or out of alinement with the key slot 33.

I claim:

1. An anti-skid tire attachment comprising a two part ring for the attachment of the cross chains, said parts having enlargements extending in the plane of the ring, bars attached to the enlargements and extending transversely thereof in face engagement and provided with alined openings, a cam surface on the rear face of one of the bars, a connecting pin extending through said openings having a head at one end engaging against the rear face of one bar and at its other end a lateral projection cooperating with said cam and serving to draw said bars together.

2. An anti-skid tire attachment comprising a two part ring for the attachment of the cross chains, said parts having enlargements extending in the plane of the ring, bars attached to the enlargements and extending transversely thereof in face engagement and provided with alined openings, one of said enlargements having extensions hooking over the far side of the bar on the other section and means for otherwise locking the bars together to prevent disengagement of said hooks.

3. An anti-skid tire attachment comprising a two-part ring for the attachment of the cross chains, said parts having enlargements extending in the plane of the ring, bars attached to the enlargements and extending transversely thereof in face engagement and provided with alined openings, one of said enlargements having extensions hooking over the far side of the bar on the other section, a cam surface on the outer face of one of the bars, a connecting pin extending through the two bars having a head engaging the outer face of the bar and provided with a finger for cooperation with said cam to hold the bars in contact with each other.

IRENEUS BASIL HOLTZ.

REFERENCES CITED

The following references are of record in the file of this patent:

UNITED STATES PATENTS

| Number | Name | Date |
| --- | --- | --- |
| 2,328,808 | Holtz | Sept. 7, 1943 |
| 1,419,885 | Moss | June 13, 1922 |
| 954,844 | Abrams | Apr. 12, 1910 |
| 1,700,272 | Schramm | Jan. 29, 1929 |
| 1,519,937 | Sedgwick | Dec. 16, 1924 |
| 1,912,481 | Hubbard | June 6, 1933 |